United States Patent Office 3,790,616
Patented Feb. 5, 1974

3,790,616
SULPHONIC ACID ESTERS, THEIR PRODUCTION AND COMPOSITIONS OF AND USES THEREFOR
Alexander Senning, Brabrand, and Hans Christian Buchholt, Aayboy, Denmark, and Robert Bierling, Wuppertal-Elberfeld, Dieter Steinhoff, Bochum, and Gerhard Trossmann, Bonn-Bad Godesberg, Germany, assignors to Bayer Aktiengesellschaft, Leverkusen, Germany
No Drawing. Filed Dec. 3, 1971, Ser. No. 204,684
Claims priority, application Germany, Dec. 9, 1970, P 20 60 551.0
Int. Cl. A61k *27/00;* C07c *143/08*
U.S. Cl. 260—456 A    17 Claims

ABSTRACT OF THE DISCLOSURE

Sulphonic acid esters of the formula:

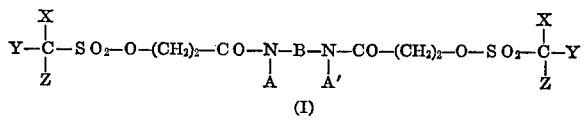

(I)

wherein A and A' are the same or different and each is hydrogen or an aliphatic moiety; B is a bifunctional aliphatic moiety; and X, Y and Z are the same or different and each is hydrogen, halogen, nitrile, pseudo-halogen or methylsulphonyl, are produced by reacting a di-iodo compound of the formula:

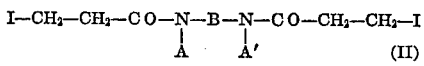

(II)

wherein A, A' and B are as above defined, with a sulphonate of the formula:

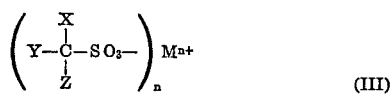

(III)

wherein X, Y and Z are as above defined; $M^{n+}$ is a cation which forms a sparingly soluble iodide; and n is 1 or 2.

These compounds are useful for their cytostatic activity against transplanted lymphatic leukaemia L 1210 in mice.

---

The present invention is concerned with aliphatic difunctional nitrogen-containing sulphonic acid esters, processes for their production, pharmaceutical compositions wherein said sulphonic acid esters are the active ingredient and methods of treating lymphatic leukaemia using these sulphonic acid esters.

Aliphatic difunctional sulphonic acid esters, such as $$CH_3-SO_2-O-(CH_2)_4-O-SO_2-CH_3$$

are known to be cytostatically active (see British patent specification No. 700,677 and German patent specification 1,177,162).

The present invention differs from the prior art in that the sulphonic acid esters of the present application contain a diamine moiety, the nitrogen atoms of which are linked by a bifunctional aliphatic moiety and further in that the terminal methyl groups may be substituted.

More particularly, the aliphatic difunctional nitrogen-containing sulphonic acid esters of the present invention may be represented by the formula:

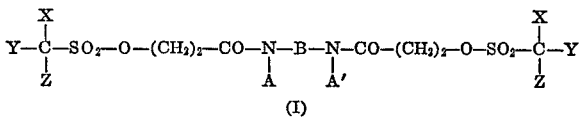

(I)

wherein A and A' are the same or different and each is hydrogen or an aliphatic moiety; B is a bifunctional aliphatic moiety; and X, Y and Z are the same or different and each is hydrogen, halogen, nitrile, pseudo-halogen or methylsulphonyl. When A and A' are aliphatic moieties, said moieties are preferably straight or branched chain alkyl of 1 to 6 carbon atoms and preferably 1 to 4 carbon atoms. According to a preferred embodiment of the present invention, the aliphatic moieties are methyl groups.

The preferred difunctional aliphatic moieties of B are straight or branched chain alkylene of 1 to 8 carbon atoms and preferably 2 to 6 carbon atoms.

When X, Y and Z are halogen, they may be fluorine, chlorine, bromine or iodine. Chlorine, bromine or iodine are preferred.

When X, Y and Z are pseudo-halogen, the preferred pseudo-halogens are —SCN, —OCN, —NCO or —N$_3$.

According to a particularly preferred embodiment of the present invention, A and A' are the same or different and each is hydrogen or methyl.

The aliphatic difunctional nitrogen-containing sulphonic acid esters of the present invention are produced by reacting a di-iodo compound of the formula:

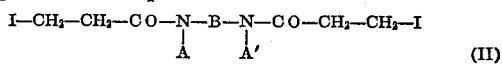

(II)

wherein A, A' and B are as above defined with a sulphonate of the formula:

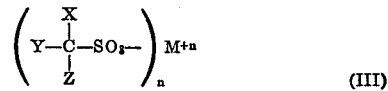

(III)

wherein X, Y and Z are as above defined; $M^{n+}$ is a cation which forms a sparingly soluble iodide; and n is 1 or 2.

A representative example of the cation $M^{n+}$ is the silver cation.

It is preferred that the di-iodo compound (II) and the sulphonate (III) be reacted in approximately stoichiometrically required amounts.

The reaction of the present invention is generally carried out at a temperature of from about 20° C. to about 150° C. and preferably from about 60° C. to about 100° C.

While the reaction may be carried out in the absence of a solvent, it is preferred that the reaction be carried out in the presence of an organic solvent. Polar aprotic solvents are preferred and acetonitrile is a representative example.

According to a preferred embodiment of the process of the present invention, the di-iodo compound (II) and the sulphonate (III) are reacted in substantial stoichiometric amounts at a temperature of from about 60° C. to 100° C. for a polar aprotic solvent wherein $M^{n+}$ is a silver cation.

Sulphonates (III) which are used as starting materials in the present process are per se known or are easily obtainable according to processes and techniques which are per se known.

The following are representative sulphonates useful in the process of the present invention:

$CH_3$—$SO_3^-Ag^+$ (melting point: 259–263° C.)
$CH_2Cl$—$SO_3^-Ag^+$ (melting point: 155.5–157.5° C.)
$CHCl_2$—$SO_3^-Ag^+$ (decomposes above 150° C.)
$CH_2Br$—$SO_3^-Ag^+$ (melting point: 196–198° C.)
$CHBr_2$—$SO_3^-Ag^+$ (melting point: 184–185° C.)
$CH_2I$—$SO_3^-Ag^+$ (melting point: 178–180.5° C.)
$NC$—$CH_2$—$SO_3^-Ag^+$ (melting point: 255–257° C.)
$CH_3$—$SO_2$—$CH_2$—$SO_3^-Ag^+$ (melting point: 186–190° C.).

Sulphonates derived from, for example, the following sulphonic acids can also be used:

$CHI_2$—$SO_3H$, $CI_3$—$SO_3H$, $CHBrCl$—$SO_3H$
$CHClI$—$SO_3H$, $CCl_3$—$SO_3H$, $CF_3$—$SO_3H$
$CHBrI$—$SO_3H$, $CBrI_2$—$SO_3H$
$CBr_2I$—$SO_3H$, $CHF_2$—$SO_3H$

The di-iodo compounds (II) can be prepared according to methods and techniques known in the art (see for example, German Auslegeschrift No. 1,138,781). The following are representative di-iodo compounds useful in the process of the present invention:

I-(CH₂)₂-CO-NH-(CH₂)₂-NH-CO-(CH₂)₂-I,
melting point: 179-182° C.

I-(CH₂)₂-CO-N(CH₃)-(CH₂)₂-N(CH₃)-CO-(CH₂)₂-I, oil

I-(CH₂)₂-CO-NH-(CH₂)₃-NH-CO-(CH₂)₂-I,
melting point: 169-171° C.

I-(CH₂)₂-CO-NH-(CH₂)₄-NH-CO-(CH₂)₂-I,
melting point: 195-196.5° C.

I-(CH₂)₂-CO-N(CH₃)-(CH₂)₄-N(CH₃)-$\overset{O}{\overset{\|}{C}}$-(CH₂)₂-I,
melting point: 99-101° C.

I-(CH₂)₂-CO-NH-(CH₂)₆-NH-CO-(CH₂)₂-I,
melting point: 185-185.5° C.

I-(CH₂)₂-CO-N(CH₃)-(CH₂)₆-N(CH₃)-CO-(CH₂)₂-I,
melting point: 105-106.5° C.

The process of the present invention may be represented by the following reaction equation:

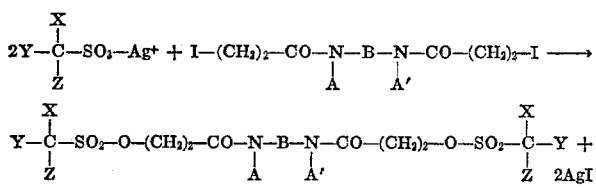

The compounds of the present invention are useful for their cytostatic activity against transplanted lymphatic leukaemia L 1210 in mice.

Our co-pending U.S. patent application Ser. No. 180,-496, filed Sept. 14, 1971 and our U.S. patent application Ser. No. 180,501, filed Sept. 14, 1971 also relates to difunctional sulphonic acid esters, processes for their production, compositions thereof and usees therefor, particularly as cytostatic agents.

The following non-limitative examples more particularly illustrate the present invention.

EXAMPLE 1

12.2 g. of silver methanesulphonate, 14.4 g. of N,N′-dimethyl - N,N′ - bis-(3-iodopropionyl)-tetramethylenediamine and 100 ml. of dry acetonitrile are stirred for 6 hours at room temperature. The mixture is left to stand overnight and is filtered. The filtrate is concentrated in vacuo, the viscous residue is dissolved in chloroform, the solution is again filtered, and the filtrate is washed with water, dried and again evaporated in vacuo. 11.9 g. of N,N′ - dimethyl-N,N′-bis-(3-methanesulphonyloxypropionyl)-tetramethylenediamine are thus obtained as a viscous oil which cannot be distilled.

The compounds of Examples 2 through 26 are produced in an analogous manner to the process described in Example 1 above, using the reactants set forth:

| Ex. No. | Compound prepared |
|---|---|
| 2 | CH₃—SO₂—O—(CH₂)₂—CO—NH—(CH₂)₂—NH—CO—(CH₂)₂—O—SO₂—CH₃, melting point: 125-131° C., from CH₃—SO₃⁻Ag⁺ and I—(CH₂)₂—CO—NH—(CH₂)₂—NH—CO—(CH₂)₂—I. |
| 3 | CH₂Cl—SO₂—O—(CH₂)₂—CO—NH—(CH₂)₂—NH—CO—(CH₂)₂—O—SO₂—CH₂Cl, melting point: 124-125° C., from CH₂Cl—SO₃⁻Ag⁺ and I—(CH₂)₂—CO—NH—(CH₂)₂—NH—CO—(CH₂)₂—I. |
| 4 | CH₂Br—SO₂—O—(CH₂)₂—CO—NH—(CH₂)₂—NH—CO—(CH₂)₂—O—SO₂—CH₂Br, melting point: 108.5-111.5° C., from CH₂Br—SO₃⁻Ag⁺ and I—(CH₂)₂—CO—NH—(CH₂)₂—NH—CO—(CH₂)₂—I. |
| 5 | CH₂I—SO—O—(CH₂)₂—CO—NH—(CH₂)₂—NH—CO—(CH₂)₂—O—SO₂—CH₂I, melting point: 138.5-141° C., from CH₂I—SO₃⁻Ag⁺ and I—(CH₂)₂—CO—NH—(CH₂)₂—NH—CO—(CH₂)₂—I. |
| 6 | CH₃—SO₂—CH₂—SO₂—O—(CH₂)₂—CO—NH—(CH₂)₂—NH—CO—(CH₂)₂—O—SO₂—CH₂—SO₂—CH₃, melting point: 118-136° C., from CH₃SO₂—CH₂—SO₃⁻Ag⁺ and I—(CH₂)₂—CO—NH—(CH₂)₂—NH—CO—(CH₂)₂—I. |
| 7 | CH₃—SO₂—O—(CH₂)₂—CO—N(CH₃)—(CH₂)₂—N(CH₃)—CO—(CH₂)₂—O—SO₂—CH₃, melting point: 88-90° C., from CH₃—SO₃⁻Ag⁺ and I—(CH₂)₂—CO—N(CH₃)—(CH₂)₂—N(CH₃)—CO—(CH₂)₂—I. |
| 8 | CH₂Br—SO₂—O—(CH₂)₂—CO—N(CH₃)—(CH₂)₂—N(CH₃)—CO—(CH₂)₂—O—SO₂—CH₂Br, oil, from CH₂Br—SO₃⁻Ag⁺ and I—(CH₂)₂—CO—N(CH₃)—(CH₂)₂—N(CH₃)—CO—(CH₂)₂—I. |
| 9 | CH₃—SO₂—O—(CH₂)₂—CO—NH—(CH₂)₃—NH—CO—(CH₂)₂—O—SO₂—CH₃, melting point: 107-110° C., from CH₃—SO₃⁻Ag⁺ and I—(CH₂)₂—CO—NH—(CH₂)₃—NH—CO—(CH₂)₂—I. |
| 10 | CH₂Cl—SO₂—O—(CH₂)₂—CO—NH—(CH₂)₃—NH—CO—(CH₂)₂—O—SO₂—CH₂Cl, oil, from CH₂Cl—SO₃⁻Ag⁺ and I—(CH₂)₂—CO—NH—(CH₂)₃—NH—CO—(CH₂)₂—I. |
| 11 | CH₂Br—SO₂—O—(CH₂)₂—CO—NH—(CH₂)₃—NH—CO—(CH₂)₂—O—SO₂—CH₂Br, melting point: 71-73° C., from CH₂Br—SO₃⁻Ag⁺ and I—(CH₂)₂—CO—NH—(CH₂)₃—NH—CO—(CH₂)₂—I. |
| 12 | CH₂I—SO₂—O—(CH₂)₂—CO—NH—(CH₂)₃—NH—CO—(CH₂)₂—O—SO₂—CH₂I, melting point: 110-112.5° C., from CH₂I—SO₃⁻Ag⁺ and I—(CH₂)₂—CO—NH—(CH₂)₃—NH—CO—(CH₂)₂—I. |
| 13 | CH₃—SO₂—CH₂—SO₂—O—(CH₂)₂—CO—NH—(CH₂)₃—NH—CO—(CH₂)₂—O—SO₂—CH₂—SO₂—CH₃, melting point: 108-112° C., from CH₃SO₂—CH₂—SO₃⁻Ag⁺ and I—(CH₂)₂—CO—NH—(CH₂)₃—NH—CO—(CH₂)₂—I. |
| 14 | CH₃—SO₂—O—(CH₂)₂—CO—NH—(CH₂)₄—NH—CO—(CH₂)₂—O—SO₂—CH₃, melting point: 130-135° C., from CH₃—SO₃⁻Ag⁺ and I—(CH₂)₂—CO—NH—(CH₂)₄—NH—CO—(CH₂)₂—I. |
| 15 | CH₂Cl—SO₂—O—(CH₂)₂—CO—NH—(CH₂)₄—NH—CO—(CH₂)₂—O—SO₂—CH₂Cl, melting point: 107-110° C., from CH₂Cl—SO₃⁻Ag⁺ and I—(CH₂)₂—CO—NH—(CH₂)₄—NH—CO—(CH₂)₂—I. |
| 16 | CH₂Br—SO₂—O—(CH₂)₂—CO—NH—(CH₂)₄—NH—CO—(CH₂)₂—O—SO₂—CH₂Br, melting point: 114.5-116.5° C., from CH₂Br—SO₃⁻Ag⁺ and I—(CH₂)₂—CO—NH—(CH₂)₄—NH—CO—(CH₂)₂—I. |
| 17 | CH₂I—SO₂—O—(CH₂)₂—CO—NH—(CH₂)₄—NH—CO—(CH₂)₂—O—SO₂—CH₂I, melting point: 131-132° C., from CH₂I—SO₃⁻Ag⁺ and I—(CH₂)₂—CO—NH—(CH₂)₄—NH—CO—(CH₂)₂—I. |
| 18 | CH₃—SO₂—CH₂—SO₂—O—(CH₂)₂—CO—NH—(CH₂)₄—NH—CO—(CH₂)₂—O—SO₂—CH₂—SO₂—CH₃, melting point: 113-117° C., from CH₃—SO₂—CH₂—SO₃⁻Ag⁺ and I—(CH₂)₂—CO—NH—(CH₂)₄—NH—CO—(CH₂)₂—I. |
| 19 | CH₂Br—SO₂—O—(CH₂)₂—CO—N(CH₃)—(CH₂)₄—N(CH₃)—CO—(CH₂)₂—O—SO₂—CH₂Br, oil, from CH₂Br—SO₃⁻Ag⁺ and I—(CH₂)₂—CO—N(CH₃)—(CH₂)₄—N(CH₃)—CO—(CH₂)₂—I |
| 20 | CH₃—SO₂—O—(CH₂)₂—CO—NH—(CH₂)₆—NH—CO—(CH₂)₂—O—SO₂—CH₃, melting point: 102-104° C., from CH₃—CO₃⁻Ag⁺ and I—(CH₂)₂—CO—NH—(CH₂)₆—NH—CO—(CH₂)₂—I. |
| 21 | CH₂Cl—SO₂—O—(CH₂)₂—CO—NH—(CH₂)₆—NH—CO—(CH₂)₂—O—SO₂—CH₂Cl, melting point: 114-117° C., from CH₂Cl—SO₃⁻Ag⁺ and I—(CH₂)₂—CO—NH—(CH₂)₆—NH—CO—(CH₂)₂—I. |
| 22 | CH₂Br—SO₂—O—(CH₂)₂—CO—NH—(CH₂)₆—NH—CO—(CH₂)₂—O—SO₂—CH₂Br, melting point: 92-96° C., from CH₂Br—SO₃⁻Ag⁺ and I—(CH₂)₂—CO—NH—(CH₂)₆—NH—CO—(CH₂)₂—I. |
| 23 | CH₂I—SO₂—O—(CH₂)₂—CO—NH—(CH₂)₆—NH—CO—(CH₂)₂—O—SO₂—CH₂I, melting point: 120-122° C., from CH₂I—SO₃⁻Ag⁺ and I—(CH₂)₂—CO—NH—(CH₂)₆—NH—CO—(CH₂)₂—I. |
| 24 | CH₃—SO₂—CH₂—SO₂—O—(CH₂)₂—CO—NH—(CH₂)₆—NH—CO—(CH₂)₂—O—SO₂—CH₂—SO₂—CH₃, melting point: 109-112° C., from CH₃—SO₂—CH₂—SO₃⁻Ag⁺ and I—(CH₂)₂—CO—NH—(CH₂)₆—NH—CO—(CH₂)₂—I. |
| 25 | CH₃—SO₂—O—(CH₂)₂—CO—N(CH₃)—(CH₂)₆—N(CH₃)CO—(CH₂)₂—O—SO₂—CH₃, melting point: 77-83° C., from CH₃—SO₃⁻Ag⁺ and I—(CH₂)₂—CO—N(CH₃)—(CH₂)₆—N(CH₃)—CO—(CH₂)₂—I. |
| 26 | CH₂Br—SO₂—O—(CH₂)₂—CO—N(CH₃)—(CH₂)₆—N(CH₃)—CO—(CH₂)₂—O—SO₂—CH₂Br, oil, from CH₂Br—SO₃⁻Ag⁺ and I—(CH₂)₂—CO—N(CH₃)—(CH₂)₆—N(CH₃)—CO—(CH₂)₂—I |

The silver methylsulphonyl-methanesulphonate used as a starting material is produced in the following manner:

114.0 g. of methanesulphenyl chloride are added dropwise over the course of 30 minutes at —40° C., under stirring, to a mixture of 210 ml. of triethylamine and 400 ml. of anhydrous acetonitrile. The mixture is stirred for a further hour at —40° C. and 9.0 ml. of water are added, again at —40° C. After being stirred for a further 15 minutes at —40° C., the mixture is filtered and the filtrate is concentrated in vacuo. After the addition of 500 ml. of 2 N NaOH, 60 g. of crystals of melting point 235-240° C. are obtained and these are filtered off. After recrystallization from ethanol/water, the sodium methylsulphonylmethanesulphonate melts at between 239° C. and 241° C. 40 g. of sodium methylsulphonylmethanesulphonate are dissolved in 1 l. of water and passed through an ion exchange column with a polystyrene synthetic resin, containing sulphonic acid groups, as the ion exchanger. The aqueous solution of the free methylsulphonylmethanesulphonic acid is digested with 69 g. of silver carbonate, whereupon 40 g. of silver carbonate remain undissolved and are filtered off. The filtrate is concentrated in vacuo, with the bath temperature not exceeding 60° C. After adding methanol, 45 g. of crystalline silver methylsulphonylmethanesulphonate of melting point 186–190° C. are obtained.

In vivo activity

The activity of the compounds of the present invention has been demonstrated against transplanted lymphatic leukaemia L 1210 in mice. The results are set forth in Table 1.

The experiments were conducted in the following manner:

$2 \times 10^5$ leukaemia cells (L 1210) in 0.2 ml. of ascites fluid were intraperitoneally injected into the mice (strain B6D2F1) weighing 18–22 g.

The treatment was carried out four times on successive days by intraperitoneal administration and was started 24 hours after the transplantation of the leukaemia cells.

The duration of the experiment was 2–3 weeks.

To evaluate the experimental results, the survival time index (ST index) was determined as follows:

If the survival time −50 of the control group is equated to 100%, a quotient can be calculated from the formula $$\text{ST index} = \frac{ST - 50 \text{ of the treated group} \times 100}{ST - 50 \text{ of the control group}}$$

and this quotient can be regarded as an index of the change in the ST under the treatment.

Assessment

Values smaller than 100% denote a reduced survival time of the treated group of animals and hence a toxic action of the preparation.

Values greater than 100% denote an increased survival time—50 which, depending on the level of the index, expresses inhibition in tumor growth.

TABLE 1

| Compound of Example No. | Leukaemia, optimum dose in mg./kg. of body weight, 4× intraperitoneally | L 12 10 survival time index percent |
|---|---|---|
| Comparison compound [1] | 50 | 106 |
| 2 | 30 | 144 |
| 3 | 15 | 344 |
| 4 | 15 | 331 |
| 5 | 60 | 193 |
| 7 | 60 | 231 |
| 8 | 60 | 294 |
| 9 | 500 | 144 |
| 10 | 500 | 207 |
| 11 | 60 | 167 |
| 12 | 60 | 167 |
| 13 | 125 | 131 |
| 14 | 200 | 113 |
| 15 | 25 | 340 |
| 16 | 25 | 167 |
| 18 | 200 | 167 |
| 19 | 250 | 194 |
| 20 | 500 | 133 |
| 21 | 30 | >1,120 |
| 22 | 60 | 447 |
| 23 | 125 | 133 |
| 24 | 500 | 127 |
| 25 | 500 | 144 |
| 26 | 500 | 169 |

[1] The comparison compound was the compound of the formula $CH_3-SO_2-O-(CH_2)_4-O-SO_2-CH_3$ (British Patent No. 700,667).

The compounds of the present invention are preferably administered orally. While in general it has proved advantageous to administer amounts of from about 5 mg. to about 50 mg./kg. of body weight per day in order to achieve effective results, it must nevertheless be borne in mind that at times, it may be necessary and/or advisable to deviate from these amounts. A variety of factors must be taken into consideration, including the body weight of the test animal, the mode of administration, the nature of the animal and its reaction towards the medication, the nature of the formulation and the point in time or the interval at which administration takes place. Thus, it can suffice in some cases to use less than the amount indicated above, while in other cases, it may be appropriate to use more than the amount indicated above. In the case of the administration of larger amounts, it is generally advisable to divide these into several individual administrations given over the course of the day.

The present invention also includes pharmaceutical compositions useful for the treatment of lymphatic leukaemia which comprise a compound of the present invention in combination with a pharmaceutically acceptable non-toxic inert diluent or carrier. This carrier may be a solid or liquid diluent or carrier as hereinafter defined.

In the present specification the expression "pharmaceutically acceptable diluent or carrier" means a non-toxic substance that when mixed with the active ingredient or ingredients render it suitable for administration. The expression preferably excludes water and low-molecular weight organic solvents commonly used in chemical synthesis, except in the presence of other pharmaceutically necessary ingredients such as salts in correct quantities to render the composition isotonic, buffers, surfactants, coloring and flavoring agents, and preservatives. Examples of suitable liquid diluents and carriers are non-toxic organic solvents or diluents, such as paraffins (for example petroleum fractions); vegetable oils (for example groundnut/sesame oil); alcohols (for example ethyl alcohol and glycerol); glycols (for example propylene glycol and polyethylene glycol); polyols; buffered aqueous solutions; isotonic saline aqueous solutions; syrups and lotion bases. Examples of suitable solid diluents and carriers are starches; natural powdered rocks (for example kaolins, aluminas, talc and chalk); synthetic powdered rocks (for example highly disperse silica and silicates); sugars (for example unrefined sugar, lactose and glucose); cellulose and its derivatives; stearates and stearic acid; and ointment bases. Examples of pharmaceutical compositions according to the invention are ointments, pastes, creams, sprays, lotions, aqueous suspensions, elixirs, syrups, granules and powders, either free-flowing or compressed into tablets.

When the pharmaceutical compositions of the present invention are in oral administration form it is preferred that these are in the form of tablets, pills, capsules, dragées, cachets and the like as well as wrapped powders containing the active compound in powdered form with a powdered diluent or carrier for suspension in water before being taken.

The diluents and carriers used are preferably therefore those that adapt the active ingredient or ingredients for oral administration. Examples of such diluents and carriers are solid vehicles, excipients and lubricants such as glucose, lactose and sucrose, corn and potato starch, sodium carboxymethyl cellulose, ethyl cellulose and cellulose acetate, powdered gum tragacantth, gelatin, alginic acid, agar, stearic acid, soidum, calcium and magnesium stearates, sodium lauryl sulphate, polyvinylpyrollidone, sodium citrate, calcium carbonate, and dicalcium phosphate.

The pharmaceutical compositions of the invention may also contain other non-toxic adjuvants and modifiers such as dyes, surfactants [primarily emulsifiers, such as nonionic and anionic emulsifiers (for example polyoxyethylene-fatty acid esters, polyoxyethylene-fatty alcohol ethers, alkylsulphonates and arylsulphonates), and dispersing agents (for example lignin, sulphite waste lyes, methylcellulose, starch and polyvinylpyrolidone)], perfumes, flavoring agents, preservatives and biocides.

The pharmaceutical compositions of the invention preferably contain 0.5 to 90 wt. percent of a new ester of the invention.

The present invention also includes pharmaceutical compositions in dosage unit form as hereinafter defined which comprise a compound of the present invention either alone or in combination with a pharmaceutically acceptable non-toxic inert diluent or carrier.

The diluent or carrier can be a diluent or carrier as above defined but can also be water or any other common pharmaceutically acceptable non-toxic inert solvent.

The expression "medicament in dosage unit form" as used in the present specification means a medicament in the form of discrete portions each containing a unit dose or a multiple or sub-multiple of a unit dose of the active ingredient(s); for example, one, two, three or four unit doses or a half, a third or a quarter of a unit dose. A "unit dose" is the amount of the active ingredient(s) to be administered on one occasion and will usually be a daily dose, or for example a half, a third, or a quarter of a daily dose depending on whether the medicament is to be administered once or, for example, twice, three times, or four times a day.

The discrete portions constituting the medicament in dosage unit form can include a protective envelope. The active ingredient can be undiluted and contained in such an envelope, or can be mixed with a pharmaceutically acceptable solid or liquid diluent or carrier as defined above. Such portions can for example be in monolithic coherent form, such as tablets, losenges, pills, suppositories, or dragées; in wrapped or concealed form, the active ingredients being within a protective envelope, such as wrapped powders, cachets, sachets, capsules, or ampoules; or in the form of a sterile solution suitable for parenteral injection, such as ampoules of buffered, isotonic, sterile, pyrogen-free aqueous solution; or in any other form known in the art.

The preferred unit dose for administration of the medicaments of the invention is 250–4,500 mg. of active ingredient. This will normally be administered once daily.

What is claimed is:

1. A compound of the formula

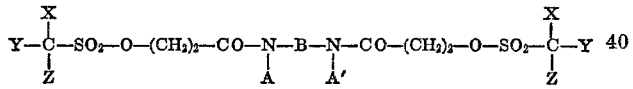

wherein

A and A′ are the same or different and each is hydrogen or straight- or branched-chain alkyl of 1 to 6 carbon atoms;

B is straight- or branched-chain alkylene of 1 to 8 carbon atoms; and two of X, Y and Z are hydrogen and the third is chlorine, bromine or iodine.

2. The compound according to claim 1 which is
$CH_2Cl-SO_2-O-(CH_2)_2-CO-NH-(CH_2)_2-NH-CO-(CH_2)_2-O-SO_2-CH_2Cl$.

3. The compound according to claim 1 which is
$CH_2Br-SO_2-O-(CH_2)_2-CO-NH-(CH_2)_2-NH-CO-(CH_2)_2-O-SO_2-CH_2Br$.

4. The compound according to claim 1 which is
$CH_2I-SO_2-O-(CH_2)_2-CO-NH-(CH_2)_2-NH-CO-(CH_2)_2-O-SO_2-CH_2I$.

5. The compound according to claim 1 which is
$CH_2Br-SO_2-O-(CH_2)_2-CO-N(CH_3)-(CH_2)_2-N(CH_3)-CO-(CH_2)_2-O-SO_2CH_2Br$.

6. The compound according to claim 1 which is
$CH_2Cl-SO_2-O-(CH_2)_2-CO-NH-(CH_2)_3-NH-CO-(CH_2)_2-O-SO_2-CH_2Cl$.

7. The compound according to claim 1 which is
$CH_2Br-SO_2-O-(CH_2)_2-CO-NH-(CH_2)_3-NH-CO-(CH_2)_2-O-SO_2-CH_2Br$.

8. The compound according to claim 1 which is
$CH_2I-SO_2-O-(CH_2)_2-CO-NH-(CH_2)_3-NH-CO-(CH_2)_2-O-SO_2-CH_2I$.

9. The compound according to claim 1 which is
$CH_2Cl-SO_2-O-(CH_2)_2-CO-NH-(CH_2)_4-NH-CO-(CH_2)_2-O-SO_2-CH_2Cl$.

10. The compound according to claim 1 which is
$CH_2Br-SO_2-O-(CH_2)_2-CO-NH-(CH_2)_4-NH-CO-(CH_2)_2-O-SO_2-CH_2Br$.

11. The compound according to claim 1 which is
$CH_2I-SO_2-O-(CH_2)_2-CO-NH-(CH_2)_4-NH-CO-(CH_2)_2-O-SO_2-CH_2I$.

12. The compound according to claim 1 which is
$CH_2Br-SO_2-O-(CH_2)_2-CO-N(CH_3)-(CH_2)_4-N(CH_3)-CO-(CH_2)_2-O-SO_2-CH_2Br$.

13. The compound according to claim 1 which is
$CH_2Cl-SO_2-O-(CH_2)_2-CO-NH-(CH_2)_6-NH-CO-(CH_2)_2-O-SO_2-CH_2Cl$.

14. The compound according to claim 1 which is
$CH_2Br-SO_2-O-(CH_2)_2-CO-NH-(CH_2)_6-NH-CO-(CH_2)_2-O-SO_2-CH_2Br$.

15. The compound according to claim 1 which is
$CH_2I-SO_2-O-(CH_2)_2-CO-NH-(CH_2)_6-NH-CO-(CH_2)_2-O-SO_2-CH_2I$.

16. The compound according to claim 1 which is
$CH_3-SO_2-O-(CH_2)_2-CO-N(CH_3)-(CH_2)_6-N(CH_3)CO-(CH_2)_2-O-SO_2-CH_3$.

17. The compound according to claim 1 which is
$CH_2Br-SO_2-O-(CH_2)_2-CO-N(CH_3)-(CH_2)_6-N(CH_3)-CO-(CH_2)_2-O-SO_2-CH_2Br$.

References Cited
UNITED STATES PATENTS 3,136,803  6/1964  Carbon _____ 260—456 A JOSEPH E. EVANS, Primary Examiner U.S. Cl. X.R.

260—349, 430, 453, 545, 561 A; 424—226, 303